United States Patent [19]

Hamaide et al.

[11] Patent Number: 4,952,005

[45] Date of Patent: Aug. 28, 1990

[54] ADJUSTABLE MIRROR ASSEMBLY

[75] Inventors: Marc F. Hamaide, Lint; Gerard J. Boeve, Edegem, both of Belgium

[73] Assignee: Agfa-Gevaert N.V., Mortsel, Belgium

[21] Appl. No.: 447,525

[22] Filed: Dec. 7, 1989

[30] Foreign Application Priority Data

Dec. 15, 1988 [BE] Belgium .............................. 88202892

[51] Int. Cl.$^5$ ..................... G02B 5/08; G02B 26/08
[52] U.S. Cl. .................................. 350/6.1; 350/631;
350/632; 350/636; 248/487
[58] Field of Search ............... 350/612, 618, 623, 626, 350/631, 632, 634, 636, 6.1, 6.5; 248/479, 485, 486, 487

[56] References Cited

U.S. PATENT DOCUMENTS

| 3,866,140 | 2/1975 | Hobart et al. | 350/634 |
| 3,875,587 | 4/1975 | Pugsley | 350/6.4 |
| 4,648,692 | 3/1987 | Kinoshita | 350/632 |
| 4,853,709 | 8/1989 | Stein et al. | 350/6.5 |

Primary Examiner—Bruce Y. Arnold
Assistant Examiner—Jay Ryan
Attorney, Agent, or Firm—William J. Daniel

[57] ABSTRACT

An adjustable mirror assembly includes a rigid base plate (35) and a mirror (16) which is integrally bonded thereto via an elastic layer (50), and adjustment screws (52, 54) that are threaded in the base place and press on the rearside of the mirror, thereby stretching the elastic layer (50).

11 Claims, 2 Drawing Sheets

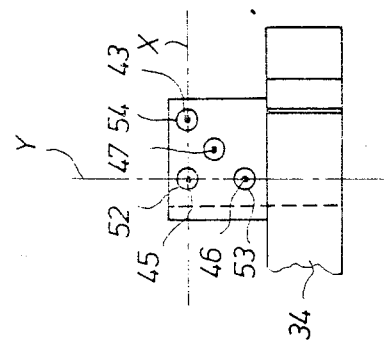
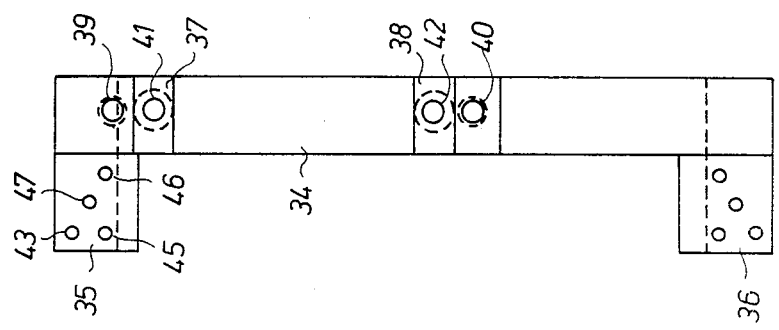
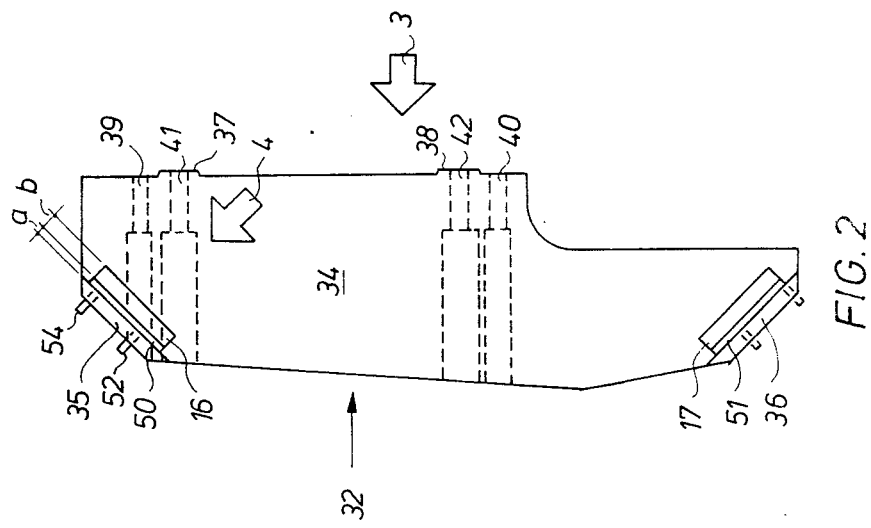

000
ADJUSTABLE MIRROR ASSEMBLY

BACKGROUND OF THE INVENTION

1. Field of the Invention

The present invention relates to an adjustable mirror assembly, in particular for use in an image-reproducing apparatus for the line-wise exposure of a light-sensitive sheet placed on the surface of a drum, by means of a reproducing head revolving in the drum. These apparatus are also known as "internal drum" exposure apparatus.

2. Description of the Prior Art

An adjustable mirror assembly is known which includes a rigid base plate and a mirror the position of which is adjustable relative thereto. The mirror is connected with the base plate through resilient means in the form of a rubberlike material that allows limited displacements of the mirror with respect to the base plate, and adjusting rods that are axially displaceable in the mirror mounting, and abut with one end onto the rigid base plate and exert thereby compression forces on the resilient means.

The construction of the described mirror assembly is rather complicated and requires at least one component with overhangs in order to allow the resilient means to be loaded in compression. An assembly of the described kind is disclosed in GB-A-No. 1,575,046.

The present invention aims to provide an adjustable mirror assembly which is of simple and compact construction.

According to the invention an adjustable mirror assembly including a rigid base plate and a mirror the position of which is relatively adjustable thereto, the mirror being connected with the base plate through resilient means in the form of a rubberlike material allowing limited displacements of the mirror with respect to the base plate, and adjusting means in the form of three studs that are axially displaceable in one of both relatively displaceable elements and abut with one end onto the other of these elements thereby exerting a load on the resilient means, is characterized in that the adjusting studs extend through the gap between both elements in which the resilient means is provided, and that the setting of said adjusting studs is such that they cause a prestretching of the resilient means.

The presence of the adjusting studs in the spacing between both elements where also the resilient means is present, leads to an assembly with a compact size. Also, the shape of the distinct components becomes uncomplicated, and in the most simple form the mirror and the base plate are rectangular members that run closely parallel with each other and are spaced over some millimeters only, the resilient means covering at least part of the adjacent surfaces of such members.

The rigid base plate may be a separate component that is rigidly fitted to another supporting element, but the base plate may also be a part of a holder or other supporting structure of an optical apparatus.

The mirror may in its simplest form exist of a flat rigid member that is provided on a free surface with a reflective layer, such as a rectangular glass plate bearing a silver coating on one surface, but the term "mirror" includes also an assembly of a reflecting member rigidly mounted in or on a suitable frame or support.

According to a suitable embodiment of the invention the resilient means is in the form of an elastic layer that is bonded to the rear surface of the mirror and the opposed surface of the base plate, and the adjusting studs extend through the resilient means. This embodiment leads to a very compact construction of the assembly.

The invention also includes an image-reproducing apparatus with an adjustable mirror assembly.

According to the invention, an image-reproducing apparatus which comprises a cylinder which is arranged for receiving a light-sensitive recording sheet on one of its surfaces, a reproducing head for linewise exposing the light-sensitive recording sheet to form an image thereon, the reproducing head bearing reflection means arranged for rotation about the axis of the cylinder to reflect a light beam that enters the cylinder axially, onto the surface of the cylinder thereby to cause the beam to move along a track of the cylindrical surface, means for causing a relative displacement between the cylinder and the head to cause a progressive displacement of the circular track along the cylindrical surface, a laser mounted outside the cylinder, and an adjustable mirror assembly in the beam path of the laser for deflecting the laser beam to coincide with the axis of the cylinder, is characterized thereby that the adjustable mirror assembly has a mirror, a substantially rigid support which makes part of the apparatus, an elastic layer bonding the mirror with its rearside to the support, and three supporting studs that extend through the gap between both elements in which the resilient means is provided and abut with one end onto one of the elements, the length of the portions of the studs extending through the gap being greater than the thickness of the elastic layer in unstretched condition whereby a pressure is exerted by each such stud on the corresponding contact area of the corresponding member, and the elastic layer is correspondingly prestretched, at least two of the studs being axially adjustable.

Apparatus of this kind is disclosed e.g. in U.S. Pat. No. 3,875,587 relating to a colour scanner for image reproduction.

In a preferred embodiment of the inventive apparatus all three studs of the adjustable mirror assembly are axially displaceable.

According to a suitable embodiment, the adjustable studs are in the form of worm screws that are in threaded engagement with the rigid support.

BRIEF DESCRIPTION OF THE DRAWINGS

The invention will be described hereinafter by way of example with reference to the accompanying drawings, wherein:

FIG. 2 illustrates in side elevation one embodiment of the mirror holder of the apparatus according to FIG. 1, FIG. 3 is an end elevation view of FIG. 2 according to the arrow 3, FIG. 4 is a view according to the arrow 4 of one mirror of the holder of FIG. 2.

Referring to FIG. 1, an internal drum scanner which is mounted within a light-tight housing 10, comprises a HeNe laser 11, an acousto optical modulator 12, a polarizing filter 13, lenses 14 and 15, two mirrors 16 and 17 for deflecting the radiation beam 18 of the laser over 180 degrees so that it coincides as a beam 19 with the axis 9 of a cylinder 20.

Figure 1:
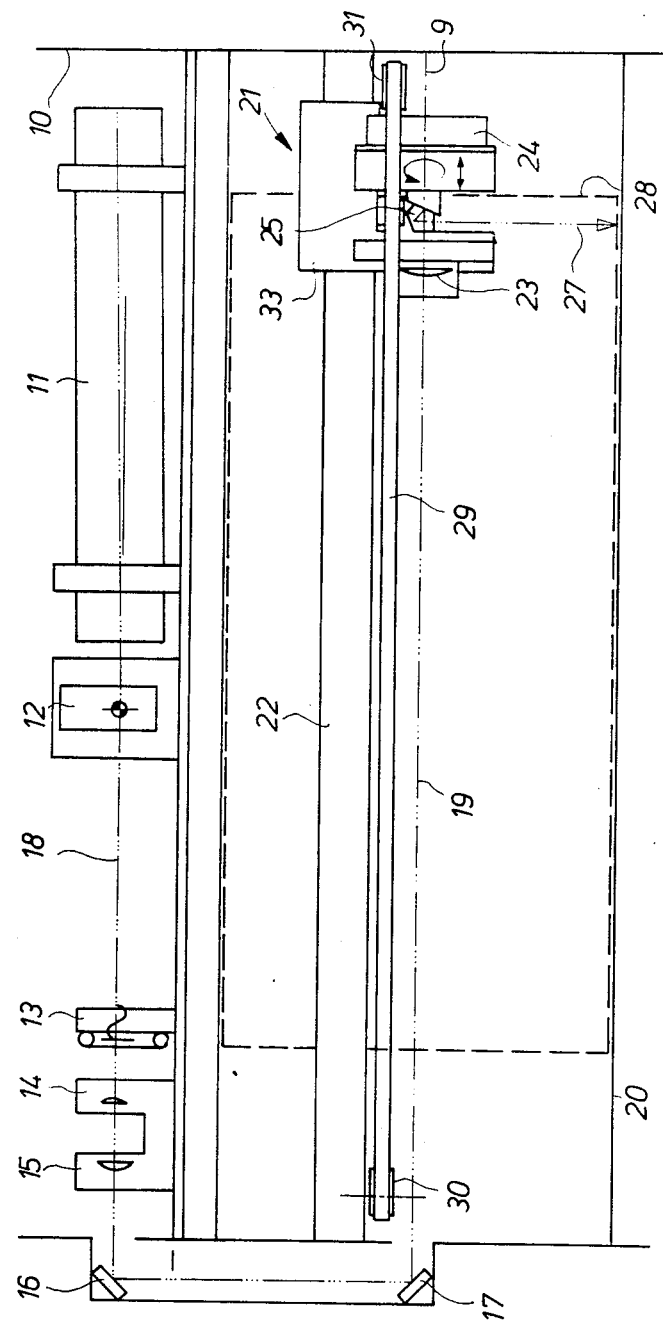
FIG. 1 is a diagrammatic representation of one embodiment of an internal drum scanner.

Inside the stationary cylinder 20 there is provided a reproducing head 21 that is displaceable along a stationary beam 22 running strictly parallel with the axis of the cylinder 20. The reproducing head comprises an input lens 23, and a motor 24 bearing on its shaft a pentaprism 25 for deflecting the radiation beam 19 over 90 degrees towards the surface of the cylinder, as indicated by the broken line 27.

On the inner surface of the cylinder there is provided a light-sensitive film sheet 28 illustrated in broken lines, the film being arranged with its sensitive side innermost.

The application of the sheet 28 into the cylinder may occur in many ways, but in a suitable way the sheet may be introduced through a slotlike opening that runs parallel with the axis of the cylinder, and slide along the inner cylinder surface until it abuts with its leading edge against a stop.

The axial displacement of the reproducing head in the cylinder may occur by means of an endless belt 29 which is tensioned over two pulleys 30 and 31, one of the pulleys being coupled to a motor, not illustrated, for driving the belt alternatingly in one or the other direction.

The combination of the rotating movement and the translating movement of the pentaprism 25 causes a scanning of the light-sensitive surface of the sheet 28 by the deflected beam section 27.

The bearing of the reproducing head 21 on the beam 22 may occur in many different ways. A suitable slide bearing is disclosed in the co-pending application entitled "Image-reproducing apparatus" filed on even day herewith, Ser. No. 447,526.

The mirrors 16 and 17 are mounted on a mirror holder 32 which is shown in detail in FIGS. 2 and 3, FIG. 3 being an end elevation view of FIG. 2 according to the arrow 3. The mirror holder 32 is basically a one-piece component that in a suitable way has been manufactured from a mechanically and thermally stable material such as cast aluminium that has received appropriate after-machining such as grinding, boring and tapping.

The mirror holder 32 comprises a central section 34 and upstanding end sections forming base plates 35 and 36 that stand at a 90° angle with respect to the central section and are at a 45° angle with respect to a reference plane which is determined by the abutment faces 37 and 38. The precise mounting of the mirror holder on the apparatus occurs by means of reference pins of the apparatus that accurately fit in bores 39 and 40 of the holder, whereas the holder is fixed by means of bolts passing through bores 41 and 42.

The base plates 35 and 36 are each provided with three threaded bores 43, 45 and 46 and a non-threaded bore 47, as illustrated for the base plate 35 in FIGS. 3 and 4. For the ease of representation, the mirrors have been omitted in the representations of FIGS. 3 and 4.

Referring to FIG. 2, the mirrors 16 and 17 are mounted on the base plates 35 and 36 by means of an elastic bonding layer 50, resp. 51. Adjustment of the mirrors is performed by means of adjustment screws such as the screws 52, 53 and 54 shown in FIGS. 2 and 4, that fit in the corresponding threaded bores of the base plate and that extend through the layers 50 and 51 to abut with their ends the mirrors.

Tightening of the screws causes an increase of the distance between a mirror and its base plate whereas loosening of the screws causes a decrease of said distance under the pulling force exerted by the pre-stretched elastic layer. More details about the co-operation between the adjustment screws and the elastic layer are given hereinafter. The adjustment screws are in a suitable form socket head worm screws.

The three adjustment screws 52, 53 and 54 are lying at the apeces of a 90° included triangle, and this enables an independent adjustment of the mirror about two axes X and Y that are normal to each other. Thus, adjustment of the screw 54 in the bore 43 causes a rotation of the mirror about a vertical axis Y since the elastic layer maintains the mirror in contact with both other, non-adjusted screws 52 and 53, see FIG. 4, whereas adjustment of the screw 53 in the bore 46 produces in a similar way a rotation of the mirror about a horizontal axis X.

The two adjustment possibilities of both mirrors enable a skilled operator to align the beam leaving the lenses 14, 15 exactly with the axis 9 of the cylinder.

The mounting of the mirrors 16 and 17 on the base plates 35, 36 proceeded as follows.

The mirror holder 32 was placed with the two abutment faces 37, 38 on an appropriate calibrating device (not shown) that provided two reference surfaces that ran closely parallel to the sides of the base plates 35, 36 where the mirrors had to come.

The distance between each reference surface and the opposed surface of a base plate was by 0.125 mm smaller than the actual distance in operation of the mirror assembly. The actual distance is equal to a+b, a being the thickness of the elastic layers 50 and 51 in prestretched condition, and b being the thickness of the mirrors 16 and 17.

The three adjustment screws of each mirror were then set so that they just touched the corresponding reference surface of the calibrating device.

The mirror holder was removed from the calibrating device and oriented so that one of the base plates faced with its frontside upwardly. A viscous liquid elastic compound was poured on the base plate, and then a mirror was placed with its rearside on top of the liquid mass, and pressed downwardly until it abutted onto the three adjustment screws, spreading thereby the liquid compound over the complete contact surface of the mirror. The position of the mirror was then fixed by means of a suitable hold-down clamping mechanism. The compound cured during 24 hours by reaction with the moisture of the air, and then formed a tough, elastic layer. The contact with the air of the central portion of the layer occurred through the hole 47.

The mirror holder was thereupon turned over 90 degrees, and the opposite mirror was fitted in place in the same way.

All the adjustment screws were then tightened over about 90 degrees to cause an increase of the thickness of the elastic layers 50 and 51 by a value of 0.125 mm up to a.

The following data illustrate the embodiment described hereinbefore:

mirrors 16 and 17: rectangular glass blocks measuring 25×25×5 mm, bearing a silver mirrorlike coating on one side,
adjustment screws: grub screws 3×0.5 mm,
distance a: 2.0 mm
elastic layers 50 and 51: produced from silicone rubber without colour pigments.

The finished mirror holder 32 was then mounted in a separate adjustment stand where the beam of a test laser was reflected over several meters distance towards a test surface so that a very precise adjustment of the mirrors was possible. This adjustment required minor corrections only of the setting of the adjustment screws. The largest occasional withdrawal of an adjustment screw was always less than the prestretching distance of 0.125 mm so that these layers performed under all conditions of adjustment their biasing function whereby a complete play-free adjustment mechanism was obtained. The adjustment was self-locking at any setting of the screws, by the frictional contact of the elastic layers with the screws, and the friction of the screws in their threaded bores.

The invention is not limited to the described embodiment of an adjustable mirror.

The elastic layer may also be in the form of a separate layer, both opposed surfaces of which are adhered to the mirror and the base plate by means of a suitable adhesive, or by a heat-meltable layer.

The adjustment screws need not necessarily run through the elastic layer itself but they may extend through openings or cut-out portions in such layer.

The mirrors may be mounted on a support plate of a size larger than that of the mirror, and the adjustment screws may be screwed through the projecting rims of such support plate and abut against the surface of the base plates 35 and 36. In this way, the setting of the adjustment screws occurs from the frontside of the mirrors rather than from the rearside as described hereinbefore.

The prestretching distance may be larger than the value of 0.125 mm in the example hereinbefore, and it will be understood that this distance depends on the type of elastic material used for the elastic layer and also on the gap distance a.

We claim:

1. In an adjustable mirror assembly including a rigid base plate (35, 36) carrying a relatively adjustable mirror (16, 17), the mirror being connected with the base plate through resilient means (50, 51) in the form of a body of rubberlike material filling a gap between them and allowing limited displacements of the mirror with respect to the base plate, and adjusting means in the form of studs (52, 53, 54) that are axially displaceable in one of said plate and mirror and engage with one end against the other thereby exerting a load on the resilient means, in combination, the improvement wherein said rubberlike material is integrally connected to said plate and mirror; the adjusting studs (52, 53, 54) extend through the gap between said plate and mirror in which the body of resilient means is provided to engage by abutment against said other of said plate and mirror, and said studs are initially given an axially displaced position such that they cause a prestretching of the resilient means (50, 51).

2. An adjustable mirror assembly according to claim 1, wherein the resilient means (50, 51) is in the form of an elastic layer that is bonded to the rear surface of the mirror and to the opposed surface of the base plate.

3. An adjustable mirror assembly according to claim 1, wherein said adjusting studs (52, 53, 54) extend through the body of resilient means.

4. An adjustable mirror according to claim 1, wherein the adjusting studs (52, 53, 54) are in the form of adjustment screws that are in threaded engagement with the rigid base plate (35, 36) and abut at their ends against the mirror.

5. An adjustable mirror assembly according to claim 1, wherein the adjustment screws are worm screws.

6. An adjustable mirror assembly according to claim 1, wherein the three studs are lying at the apices of a 90° included triangle, at least the studs lying at the two apices at the ends of the hypotenuse of the triangle being axially adjustable.

7. An image-reproducing apparatus which comprises: a cylinder (20) which is arranged for receiving a light-sensitive recording sheet (28) on one of its surfaces, a reproducing head (21) for exposing the light-sensitive recording sheet linewise to form an image thereon, the reproducing head bearing reflecting means (25) arranged for rotation about the axis (9) of the cylinder to reflect a light beam (19) that enters the cylinder axially against the surface of the cylinder, thereby causing the beam to move along a track of the cylindrical surface means resulting in a relative displacement between the cylinder and the head to effect a progressive displacement of the circular track along the cylindrical surface, and a laser (11) mounted outside of the cylinder, and an adjustable mirror assembly in the beam path of the laser for deflecting the laser beam to coincide with the axis of the cylinder, said adjustable mirror assembly having a mirror (16, 17), a substantially rigid support (33, 36) which constitutes part of the apparatus, an elastic layer (50, 51) integrally bonding the mirror along its rearside to the support and defining a gap therebetween, and three supporting studs, at least two of the studs being axially adjustable (52, 53, 54), that extend through said gap and abut with one end against one of such support and mirror, the length of the portions of the studs extending through the gap being greater than the thickness of the elastic layer in relaxed condition, whereby a tensioning force is exerted by each such stud on the elastic layer and the elastic layer is correspondingly prestretched.

8. An image-reproducing apparatus according to claim 7, wherein all three studs (52, 53, 54) are axially adjustable.

9. An image-reproducing apparatus according to claim 7, wherein the adjustable studs (52, 53, 54) are in the form of worm screws that are in threaded engagement with the rigid support (35, 36).

10. An image-reproducing apparatus according to claim 7, wherein two studs (53, 54) form with a third stud (52) a right-angle configuration.

11. An image-reproducing apparatus according to claim 10, wherein one leg (X) of the stud configuration runs horizontally and the other leg thereof (Y) runs vertically.

* * * * *